M. G. HUBBARD.
Harvester Cutter.
No. 44,193.
Patented Sept. 13, 1864.
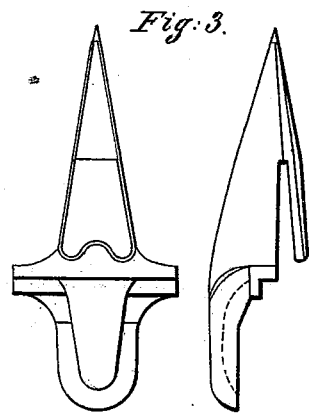
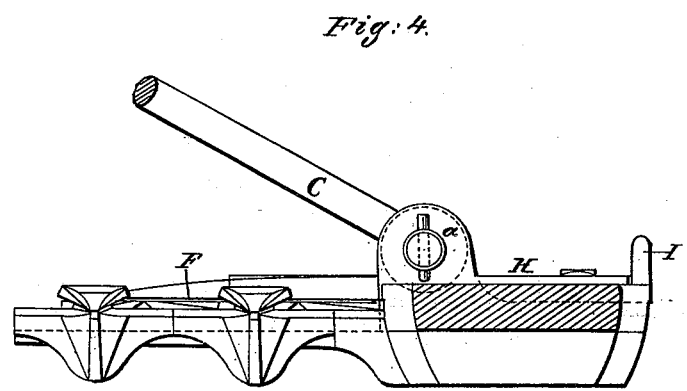
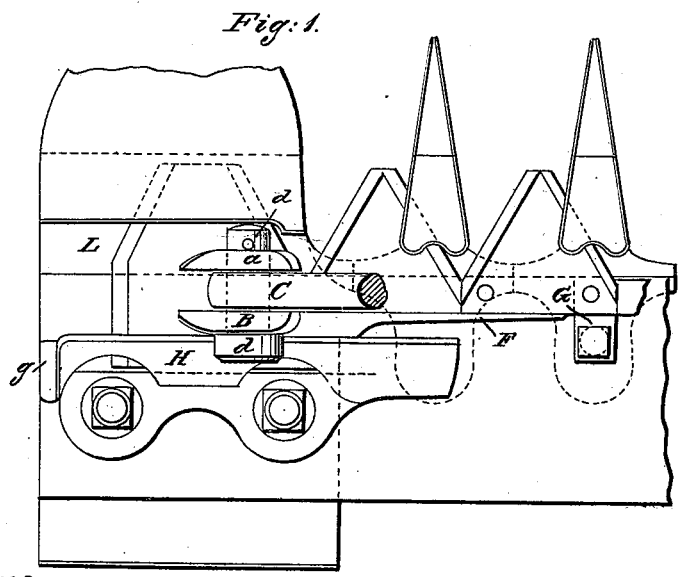
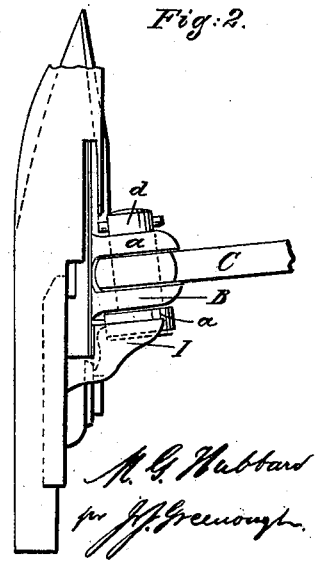

UNITED STATES PATENT OFFICE.

MOSES G. HUBBARD, OF SYRACUSE, NEW YORK.

IMPROVEMENT IN THE CUTTING APPARATUS OF MOWING-MACHINES.

Specification forming part of Letters Patent No. 44,193, dated September 13, 1864.

*To all whom it may concern:*

Be it known that I, M. G. HUBBARD, of Syracuse, Onondaga county, New York, have invented certain new and useful Improvements in Mowing-Machines; and I do hereby declare and ascertain the same as follows, reference being had to the accompanying drawings, illustrative thereof.

The improvements herein described consist in a new arrangement and construction of some of the parts of the cutting apparatus of my well-known two-wheeled mowing-machine, and are calculated to adapt it to the many different varieties of grasses and surfaces of land and the various obstacles which different sections of the country present to such a machine, and to add to the safety and convenience of its pitman-connection, and at the same time diminish its expense and add greatly to its durability. Other machines now in use are well adapted to some particular localities; but none of them have the requisite qualities to encounter successfully all of the obstacles which they must meet in an extensive agricultural country; and while manufacturers have made our machines uselessly expensive, they have lacked the durability and reliability absolutely necessary for the greatest degree of public usefulness. Most of the machines in common use will work tolerably well in thin timothy-grass upon an unobstructed surface; but these machines, in order to meet the general wants of the farming community, must also operate perfectly in heavy fine grass, tall light grass, heavy tangled clover, lodged wild grass, prairie-grass, and all their intermediates, and they must clear themselves of cut grass; and their construction must be upon such principles that they may encounter successfully such obstacles as "wet fog," old manure, soft knobs of wet clay projecting up from the surface, &c.; but especially on Western farms they will meet a serious obstacle called "gopher-hills," which require peculiar features in the cutting apparatus to cut through them without clogging with the wet clay or soft soil of which they are formed.

It has been my constant aim, through a thorough and protracted series of experiments, to combine in the cutting apparatus of my machine all of the requisite qualities for encountering these various obstacles, and the new features herein described seem to complete this part of my machine and qualify it for all emergencies, while it attains apparently the greatest possible degree of durability.

Figure 1 in the drawings hereto attached is a top view of a portion of my improved cutting apparatus. Fig. 3 is a view of one of the dividers detached; Fig. 4, front view of the finger-bar and cutter-bar and of the pitman-connection, a top view of which is seen at the inner end of Fig. 1. This joint is a very important item in a machine, and I have made it a special study and effort to adapt it to its peculiar work.

It is necessary that the crank should be considerably higher than the cutter-bar, in order to raise it and the pitman above the cut grass. This causes an up-and-down force at the joint, and to counteract this I find it necessary to adopt unusual precaution in holding down the inner end of the cutter-bar, and to give it a wide bearing both on its upper and lower sides.

I find it necessary to make the pitman of steel, and for economy in making this steel pitman I have found it best to make the cutter-bar head of malleable iron, so as to form a bifurcated jaw of two ears on its upper side, as shown at A and B, Fig. 1, to receive the single end of the pitman, as shown at C, Fig. 1, and so as to form a broad bearing in front of this joint to hold the inner end of the cutter-bar securely vertically, as shown at E, Fig. 1, and with this arrangement I use a light steel cutter-bar; but I find it absolutely necessary to prevent the crystallization of these steel parts by the rapid concussion incident to their vibratory motion; and this I have found by a long series of experiments is best attained by the use of a wooden cutter-bar pin, as shown at $d$, Fig. 1, which has the effect of introducing a cushion between the pitman and cutter-bar, and thereby materially diminishing the concussion and the consequent tendency to crystallization and breaking of the steel parts. In order to attach this cutter-bar head most securely to the cutter-bar, I have found it best to extend it to a point near the center of the second or third cutter, diminishing its thickness at the end in a wedge form, and then giving the cutter-bar a slight bend at this point, so that its upper surface will rise up on a level with the top of the cutter-bar head, as shown at F, Fig. 4. This arrangement admits of securing the cutter-bar head by one of the rivets of the third cutter, and all of the rivets of the second and first cutter, and by one or more rivets at its inner end as the cutter-bar extends to the extreme inner end of the head. By means of the bolts which attach the dividers I also attach thin ways, upon which the thin steel cutter-bar plays, one of which is shown at G, Fig. 1, and these ways serve an important purpose in adjusting the position of the cutter-bar and cutters with respect to the lower side of the slit in the divider-fingers when the thickness of the finger-bars and cutter-bars varies, as often happens in manufacturing.

In hinged machines like mine it is often convenient to place the cutting apparatus in a vertical position for transportation, and in this position it is necessary to prevent the cutter-bar from dropping down. In order to do this without rendering it inconvenient to remove the cutter-bar for grinding cutters, &c., I form a vertical projection on the way-piece H, as shown at I, Figs. 1 and 4, and then I form the head of the cutter-bar pin $d$ so as to project back far enough to strike the said projection I and prevent the cutter-bar from dropping materially out of position.

The projection I may be cast on the way-cap R, which holds down the cutter-bar head on its rear side just as the cap L holds it down on its front side, and it will be seen that these two caps securely hold the inner end of the cutter-bar in position, and by their wide surfaces insure great durability. Fig. 3 shows my new dividers.

While the principles indicated in my patent dated May 10, 1859, were theoretically correct for constructing the dividers or fingers of these machines, I have found it necessary to depart from them in manufacturing largely on account of the great expense involved in that form of construction, and on account of their liability to break or bend at the front end of their slits and at their points. It is absolutely necessary that each of these dividers should be highly polished, in order to enter the early moist grasses and wet undergrowth, and although the circular form of the "cone" is best adapted to clear itself it is found to be practically impossible to give the necessary polish in that form without too great expense, and it has therefore been found necessary to abandon that method of constructing the dividers, and develope an entirely new method of construction and external conformation, which, while it attains the specifically described objects of the other to the greatest practicable extent, also admits of attaining the necessary polish of the surfaces, and secures the requisite degree of strength and durability. To accomplish these objects I increase the diameter of the dividers at the front ends of their slits, which gives their longitudinal outlines a slight curve, and then, instead of giving them the circular form of a cone, I make them in the form of a hexagon, with six unequal sides, as shown at Fig. 3, which enables the manufacturer to give them a perfect polish by simply passing them six times over the grindstone and emery-wheel; but I have found it equally important that the cap or upper part of the divider, forming the cover of the slit, and which supports the grass above the cutter while being cut, should be exactly (or nearly so) of same width as the lower part of the divider, so that the grass standing next to the divider will stand straight while being cut. This peculiarity I have found to be in the highest degree important, because, when these caps are made narrower than the lower parts of the dividers, the grass is pressed over from the cutters and inclines them (when at all dull) to rise from the lower part of the divider, and when these caps are made wider than the lower part of the dividers they present unnecessary resistance in entering thick grass, and they incline the grass in such a direction that it has a greatly increased tendency to be forced into the slits by the cutters, and produce what is called "clogging" or "choking."

As these machines are frequently used on sandy soil and on soft uneven surfaces, I have found it necessary to protect the under side of the cutter from grit and dirt by placing it back on the finger-bar, and forming thin flanges or shoulders on the rear of the dividers, which project up in front of the finger-bar and cutter-bar, and entirely shield the latter from grit and dirt and keep its under side clean, so that it vibrates without unnecessary resistance or wear; and in order to avoid the adhesion and resistance which would result from the juice and gum from the grass accumulating under the cutter-bar I use the small ways G, Fig. 1, for the additional purpose of keeping the cutter-bar up and free from contact with the finger-bar; but while attaining the last-described results I have encountered still another obstacle of a very serious nature in the accumulation of lumps of soft dirt and manure, &c., under the cutters and between the dividers, on account of the abruptness of their rear shoulders under the cutters when these shoulders or flanges extended up immediately in front of the front edge of the finger-bar. This difficulty in some sections was almost fatal to the success of my machine, and it became absolutely necessary to overcome it. I have successfully avoided it by placing the front edge of my cutter-bar a short distance in front of the finger-bar, which gives the rear shoulder of the divider an increased inclination downward and backward, and thereby permits the obstruction to pass under the finger-bar.

What I claim is—

1. Constructing the head by which the pitman is connected with the cutter-bar with two ears, which form the hinge, one of which ears is located upon the dumb cutter or projection in front, the shank being tapering so as to be attached to the cutter-bar, all formed and arranged as herein specified.

2. The vertical projection I, in combination with the pin $d$, for the purposes set forth.

3. Forming the divider, Fig. 3, substantially as described, consisting of an outline of hexagonal form gradually tapering to a point on a line with the cutter, and having a shoulder and shank, by which I form a divider of sim- and cheap construction, as and for the purposes set forth.

4. Introducing a cushion between the vibrating steel parts of the cutting-bar and pitman of a harvester, specifically as and for the purposes described.

M. G. HUBBARD.

Witnesses:
C. J. LYSTER,
G. R. PELTON.